US010992536B2

(12) United States Patent
Karasaridis et al.

(10) Patent No.: US 10,992,536 B2
(45) Date of Patent: Apr. 27, 2021

(54) METHOD AND APPARATUS TO CONTROL ANYCAST TRAFFIC USING A SOFTWARE DEFINED NETWORK CONTROLLER

(71) Applicant: AT&T Intellectual Property I, L.P, Atlanta, GA (US)

(72) Inventors: Anestis Karasaridis, Oceanport, NJ (US); Douglas M. Nortz, Red Bank, NJ (US); Ashwin Sridharan, Morris Plains, NJ (US); Patrick Michael Velardo, Jr., Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 677 days.

(21) Appl. No.: 15/237,042

(22) Filed: Aug. 15, 2016

(65) Prior Publication Data

US 2018/0048525 A1    Feb. 15, 2018

(51) Int. Cl.
| | |
|---|---|
| *H04L 12/24* | (2006.01) |
| *H04L 29/12* | (2006.01) |
| *H04L 29/08* | (2006.01) |
| *H04L 29/06* | (2006.01) |
| *H04L 29/14* | (2006.01) |
| *H04L 12/26* | (2006.01) |
| *H04L 12/721* | (2013.01) |

(52) U.S. Cl.
CPC ......... *H04L 41/0896* (2013.01); *H04L 43/08* (2013.01); *H04L 45/70* (2013.01); *H04L 61/1511* (2013.01); *H04L 67/02* (2013.01); *H04L 67/10* (2013.01); *H04L 67/2809* (2013.01); *H04L 69/165* (2013.01); *H04L 69/40* (2013.01); *H04L 63/1416* (2013.01)

(58) Field of Classification Search
CPC .............................. H04L 12/26; H04L 12/24
USPC ......................................................... 709/223
See application file for complete search history.

(56) References Cited

U.S. PATENT DOCUMENTS

| | | | |
|---|---|---|---|
| 9,167,032 B2 | 10/2015 | Van der Merwe et al. | |
| 9,191,292 B2 | 11/2015 | Santoro et al. | |
| 9,210,180 B2 | 12/2015 | Zisapel et al. | |
| 9,276,877 B1 | 3/2016 | Chua et al. | |
| 9,967,852 B2* | 5/2018 | Joe | H04L 41/082 |

(Continued)

FOREIGN PATENT DOCUMENTS

| | | |
|---|---|---|
| CN | 104853002 A | 8/2015 |
| CN | 105306622 A | 2/2016 |

OTHER PUBLICATIONS

Futamura et al.; "vDNS Closed-Loop Control: A Framework for an Elastic Control Plane Service"; IEEE Conf. on Network Function Virtualization and Software Defined Network; 2015; p. 170-176.

*Primary Examiner* — Sibte H Bukhari
(74) *Attorney, Agent, or Firm* — BakerHostetler

(57) ABSTRACT

Systems, methods and computer readable media are provided to control anycast traffic using a software defined network controller. Telemetry and event data is gathered from a plurality of service nodes in the network. The telemetry and event data sent by an event broker to an analytic application with a resource conditions at each of the plurality of service nodes is determined based on the telemetry and event data. Traffic routing change recommendations are provided to a software defined network controller based on resource conditions at each of the plurality of service nodes and a set of predetermined policies.

17 Claims, 8 Drawing Sheets

(56) References Cited

U.S. PATENT DOCUMENTS

| | | | |
|---|---|---|---|
| 2003/0105865 A1* | 6/2003 | McCanne | H04L 12/18 709/225 |
| 2009/0252134 A1* | 10/2009 | Schlicht | H04L 1/0015 370/338 |
| 2011/0153719 A1* | 6/2011 | Santoro | H04L 29/12066 709/203 |
| 2012/0198022 A1* | 8/2012 | Black | H04L 67/1097 709/217 |
| 2014/0089500 A1 | 3/2014 | Sankar et al. | |
| 2014/0129699 A1* | 5/2014 | Jeftovic | H04L 41/0668 709/224 |
| 2014/0201838 A1* | 7/2014 | Varsanyi | G06F 21/552 726/23 |
| 2015/0215388 A1 | 7/2015 | Kontothanassis et al. | |
| 2015/0372929 A1 | 12/2015 | Rochwerger et al. | |
| 2016/0021055 A1 | 1/2016 | Krzywonos et al. | |
| 2016/0036762 A1 | 2/2016 | Droms et al. | |
| 2016/0080259 A1 | 3/2016 | Biancaniello | |
| 2016/0112275 A1 | 4/2016 | Park et al. | |
| 2016/0142251 A1 | 5/2016 | Contreras et al. | |

\* cited by examiner

METHOD AND APPARATUS TO CONTROL ANYCAST TRAFFIC USING A SOFTWARE DEFINED NETWORK CONTROLLER

TECHNICAL FIELD

The disclosed subject matter relates to the field of data packet transmission on a network, and more particularly to systems and methods for controlling anycast traffic using a software defined network controller.

BACKGROUND

A data network is a collection of interconnected communication links for transporting data between nodes, such as servers. To transport data over the network the nodes exchange discrete packets containing the data using protocols, such as the Transmission Control Protocol/Internet Protocol (TCP/IP) or the Internetwork Packet eXchange (IPX) protocol.

There are a variety of networks types available, including local area networks (LANs) and wide area networks (WANs). LANs typically connect nodes that are in geographic proximity. WANs, in contrast, typically connect large numbers of geographically dispersed nodes over long-distance communications links. The Internet is an example of a WAN that connects various networks, providing communication between nodes in those networks.

Networks include a variety of network nodes, such as routers or switches. These nodes are interconnected to form the network and are usually configured to forward traffic through the network. A function that may be performed by an intermediate node is to implement a routing protocol. Examples of routing protocols include the Border Gateway Protocol (BGP) or the Open Shortest-Path First (OSPF) protocol. Routing protocols enable the exchange of routing information that may be used by the intermediate nodes to forward (route) traffic carried by the nodes through the data network from a source to a destination.

Some data networks contain server nodes configured to provide services to client nodes coupled to the network. Typically, a client node accesses a particular service by issuing requests to the server node providing the service. The server node receives the request, processes it, and depending on the nature of the request may respond to the client with results. An example of such a service is the Domain Name System (DNS) service for resolving a fully qualified domain name to an IP address. In the DNS service example, a client accesses the DNS service by issuing a request to the DNS server. The request will include the fully qualified domain name that is to be resolved. In processing the request the DNS server may search a database to locate an IP address associated with the fully qualified domain name. The server will send a response to the client including the IP address if the IP address is found, or a response message indicating that the fully qualified domain name cannot be resolved if the IP address is not found.

Typically, data networks employ many servers configured to provide the requested service. In one type of arrangement, an "anycast" address may be associated with the service and each server providing the service is configured with the anycast address. An anycast address refers to a single address assigned to a plurality of nodes. Servers typically utilize an anycast address to enable access to their particular service, such as a DNS service, a dynamic host control protocol (DHCP) service, or a rendezvous point (RP) associated with a protocol independent multicasting sparse mode (PIM-SM) service. A client typically accesses the service by issuing one or more requests containing the anycast address as a destination address in each request. Intermediate nodes in the network forward the requests to the server configured with the anycast address that is typically located at the shortest path from the requesting client. The server acquires the requests and processes them accordingly, which may include responding to the client.

DNS resolvers for some services provided by telecommunication networks may handle in excess of 200 billion queries per day, or 4 million queries per second at peak. In anycast communications, if one site fails, BGP automatically sends traffic to next closest site. However, the next closest site may not have enough server capacity, which will cause a site failure. In some cases cascading failures may happen across the DNS sites. This phenomenon is illustrated in FIGS. 3, 4, and 5. FIG. 3 illustrates a network 201 having a plurality of DNS nodes (DNS Node 203, DNS Node 205, DNS node 207, and DNS node 209). Accessing DNS node 203 may be a plurality of services such as video hub offices (VHO 211, VHO 213, and VHO 215). Similarly, accessing DNS node 205 there may be a plurality of services such as VHO 217 and VHO 219. Illustrated in FIG. 4 is what happens when there is a failure of DNS node 203. In that case, the services for VHO 211, VHO 213, and VHO 215 will be routed to DNS node 205 (next closest site). As illustrated in FIG. 5 the routing of the traffic to DNS node 205 may cause failure of DNS node 205 which will result in the routing of all traffic to DNS node 207. Typically network operators will install excess capacity to avoid cascading failure so that most existing non-virtualized DNS infrastructures operate at low average (20-30%) utilization. This approach is expensive.

Additionally, it has been found that running a DNS resolver service "hotter", in the range of 60-80% utilization, improves the transactional efficiency (CPU cycles per transaction) of the physical hardware and improves the performance through reduced latency as a result of an increased cache-hit ratio. However, this target range, while desired, does not allow for the absorption of bursts in queries or other requests; therefore, currently new vDNS virtual machines (VMs) may need to be deployed in one or more locations as needed in an automated fashion.

During a distributed denial of service (DDoS) attack, efficient operation must be balanced with the ability to maintain service at adequate levels and avoid service impacting outages. Traditionally, for open services like DNS, defending against DDoS attacks is done either by over-provisioning the service capacity or by re-routing traffic to scrubbing centers where the attack traffic can be filtered, allowing only legitimate traffic to reach the service nodes. Both approaches are extremely costly and can become impractical as the bit rate of attacks increases to several hundred Gbps Currently, it takes many hours or even days to recover from network-based attacks on DNS, since a manual and labor intensive process is required to detect, characterize the attack and send all (attack and legitimate) traffic to network scrubbers. With the size of attacks and legitimate traffic increasing, a commensurate increase of scrubbing capacity in bandwidth and number of scrubbing sites is required.

In view of the foregoing, there is a need to accommodate increased DNS traffic without the accompanying capital investment in capacity. Further, there is a need provide routing methods that minimize cascading failures in networks and that can withstand network based attacks. Also there is a need to provide a method to recover from network based attacks without significant increase in scrubbing capacity.

SUMMARY OF THE DISCLOSURE

In one embodiment, the present disclosure teaches a method for controlling anycast traffic using a software defined network controller. For example the method gathers telemetry and event data from a plurality of service nodes in a network and sends the telemetry and event data via an event broker to an analytic application. Conditions at each of the plurality of service nodes based upon the telemetry and event data are detected. Traffic routing change recommendations are then provided to a software defined network controller based on resource conditions at each of the plurality of service nodes and a set of policies.

In another embodiment, the present disclosure includes a system for controlling anycast traffic using a software defined network controller including a memory for storing computer instructions and a processor coupled with the memory for executing the computer instructions. The computer instructions perform operations including gathering telemetry and event data from a plurality of service nodes in a network and sending the telemetry and event data via an event broker to an analytic application. The operations further include detecting resource conditions at each of the plurality of service nodes based upon the telemetry and event data; and providing traffic routing change recommendations to a software defined network controller based on resource conditions at each of the plurality of service nodes and a set of policies.

Further exemplary embodiments include computer-readable medium having computer-executable instructions stored thereon which, when executed by a computer, cause the computer to perform a method including gathering telemetry and event data from a plurality of service nodes in a network, and sending the telemetry and event data via an event broker to an analytic application. The method also includes detecting resource conditions at each of the plurality of service nodes based upon the telemetry and event data, and providing traffic routing change recommendations to a software defined network controller based on the resource conditions at each of the plurality of service nodes and a set of policies.

Other systems, methods, and/or computer readable media according to embodiments will be or become apparent to one with skill in the art upon review of the following drawings and detailed description. It is intended that all such additional systems, methods, and/or computer readable medias be included within this description, be within the scope of the exemplary embodiments, and be protected by the accompanying claims.

DETAILED DESCRIPTION OF ILLUSTRATIVE EMBODIMENTS

Figure 1:
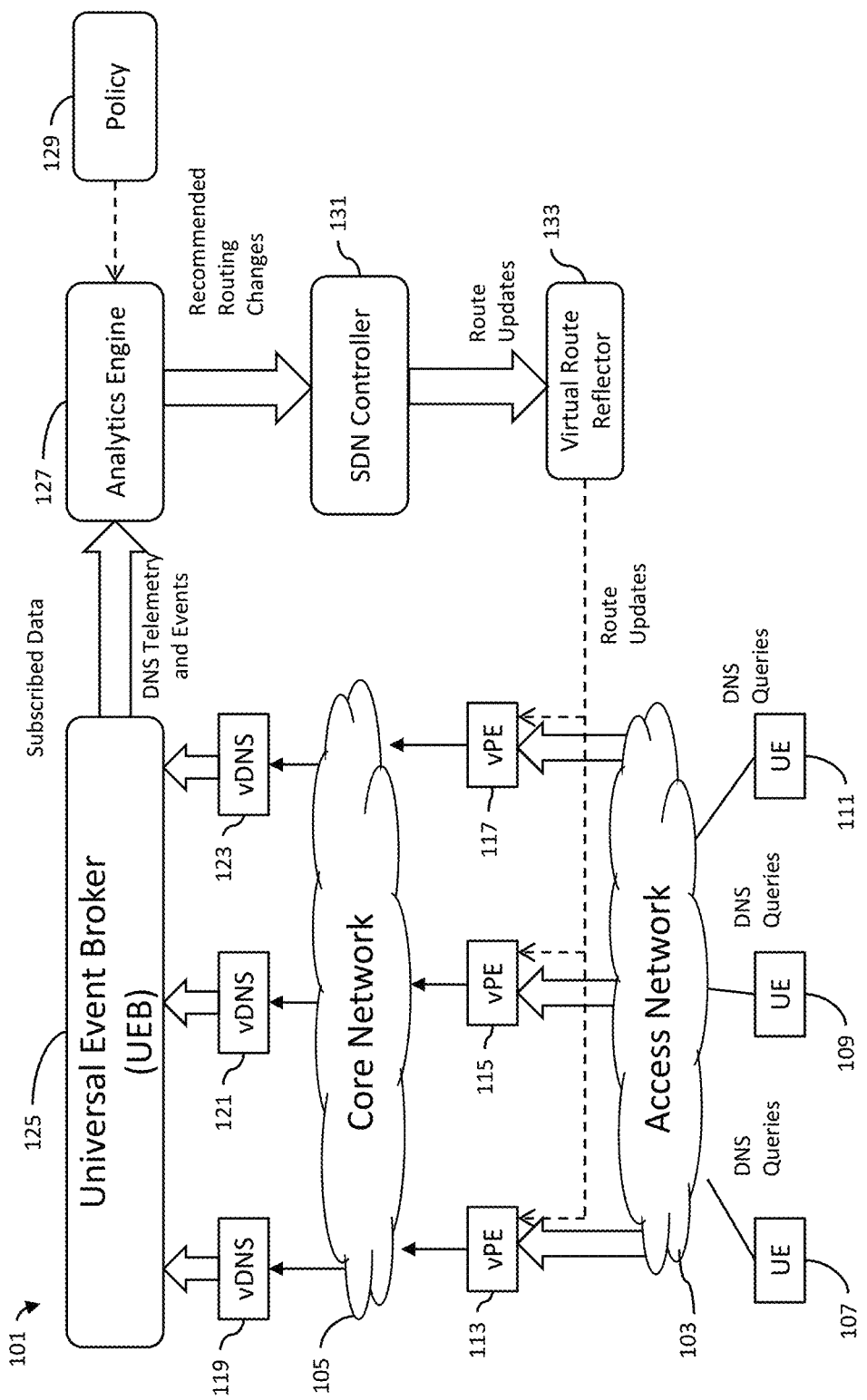
FIG. 1 is a schematic of the system for controlling anycast traffic.

Illustrated in FIG. 1 is an embodiment of a system for controlling anycast traffic 101 in accordance with the present disclosure. The system for controlling anycast traffic 101 includes an access network 103 and a core network 105. Access network 103 is a network that connects users, for example subscribers of a telecommunication service provider, to the actual service provider, whose functionality is comprised in the core network 105. The core network 105 may provide cloud services which may include various services, such as software development platforms, servers, storage, and software, over the Internet.

A plurality of user equipment, such as for example user equipment 107, user equipment 109 and user equipment 111 may connect to the access network 103 to subscribe to cloud services provided by the core network 105. User equipment 111 may comprise smart phones, cell phones, computers, tablet computers, and the like.

The system for controlling anycast traffic 101 may include a plurality of virtual provider edge routers (for example, vPE 113, vPE 115, and vPE 117) that connect the access network 103 to the core network 105. An edge router is a specialized router residing at the edge or boundary of a network. This router ensures the connectivity of its network with external networks, a wide area network or the Internet. An edge router may use BGP as its routing protocol, which is used extensively over the Internet to provide connectivity with remote networks. Instead of providing communication with an internal network, which the core router already manages, an edge router may provide communication with different networks and autonomous systems.

The system for controlling anycast traffic 101 may also include a plurality of virtual machines such as virtual domain name system resolvers (vDNS 119, vDNS 121, and vDNS 123) coupled to the core network 105. A DNS resolver, more commonly referred to as a "DNS lookup" tool, resolves an individual host name to an IP address. This type of resolve command helps to figure out how Web services are hosted, how a domain name is supported and how various hardware devices correspond to particular servers and vendors or to their client companies.

The system for controlling anycast traffic 101 may also include a universal event broker (UEB 125). UEB 125 is a component that receives event posting messages, filters them, and distributes them to subscribers. For example, UEB 125 may receive event notifications and telemetry from vDNS 119, VDNS 121 and vDNS 123 which may then be distributed to other applications in the system. Telemetry data include several metrics collected from the physical elements (hosts, switches, load balancers, and routers), hypervisors, and applications of the production platform. Certain data feeds provide periodic updates (e.g., counters every 5 minutes), while others are event driven (e.g., traps, alarms). For each of the hosts and virtual network functions, CPU, memory, disk, and networking statistics are collected. At the virtualization layer, data on clusters (groups of hosts) and resource pools (groups of VMs) may be collected. In the case of a DNS application, DNS metrics collected include counts of queries (received and sent upstream by resolvers), responses, timeouts and errors, as well as statistics on User Datagram Protocol (UDP) (e.g., idle, open sockets), Transmission Control Protocol (TCP) (e.g., active or passive socket opens), and Internet Control Message Protocol (ICMP) (e.g., destination unreachable) network traffic. Telemetry counters may be collected centrally and may be read through an SQL interface. In addition, Real-time events (such as alarms) may be provided through UEB 125.

UEB 125 is coupled to an analytics engine 127. The analytics engine 127 provides data collection, analysis and correlation. Dimensions of analytics include temporal (real time, recent, past, near future, future), locational, functional, quantitative (statistics), trends, policies, external influences, forecasting/engineering, traffic management, etc. Analytics will utilize various technologies, including extraction, stream processing, real-time and off-line analysis.

Analytics engine 127 is in turn coupled to a policy module 129. To manage a flexible set of operational scenarios for vDNS (and other applications or services running on the same platform) in a unified fashion, a policy-driven framework is provided. Using this framework, each scenario is identified by a signature, which, when detected, would trigger an action or provide a recommendation to the software defined network (SDN) controller 131. The signature may use any combination of metrics, depending on the application, and can be expressed by an arbitrary algebraic expression. The recommendations and actions are programmed as functions/modules into the platform. The set of recommendations and actions for each signature is determined by a user-defined policy construct. Policies are conditions, requirements, constraints, attributes, or needs that must be provided, maintained, and/or enforced. Policies permit simpler management/control of complex mechanisms via abstraction. At a lower level, policies involve machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allows rapid updates through easily updating rules, thus updating technical behaviors of components in which those policies are used, without requiring rewrites of their software code.

Analytics engine 127 provides recommended routing changes to SDN controller 131. SDN controller 131 is an application in software-defined networking (SDN) that manages flow control to enable intelligent networking. SDN controller 131 may be based on protocols, such as OpenFlow, that allow servers to tell switches where to send packets. SDN controller 131 is the application that acts as strategic control point in a software defined network, manages flow control to the switches/routers 'below' (via southbound APIs) and the applications and business logic 'above' (via northbound APIs) to deploy intelligent networks.

SDN controller 131 provides route updates to a virtual Route reflector (vRR 133). Route reflectors have been used as part of BGP networks to help eliminate the need for a full internal BGP mesh within an autonomous system. In current networks, the route reflector function is usually run on an IP router that is either dedicated for route reflection or that performs the route reflection function in addition to other IP routing and services functions. However, a router used solely for route reflection functions is usually underutilized in the data plane because route reflection functions require minimal data-plane resources. Moreover, a router that shares the route reflection function with other IP routing functions may not have sufficient resources (CPU and memory) to support scalable route reflection. A vRR such as vRR 133 offers more flexible deployment options and upgrades for improved scale and performance. Scale and performance levels can be adjusted up or down as needed by flexibly allocating virtual machine (VM) resources to the vRR 133.

Figure 2:
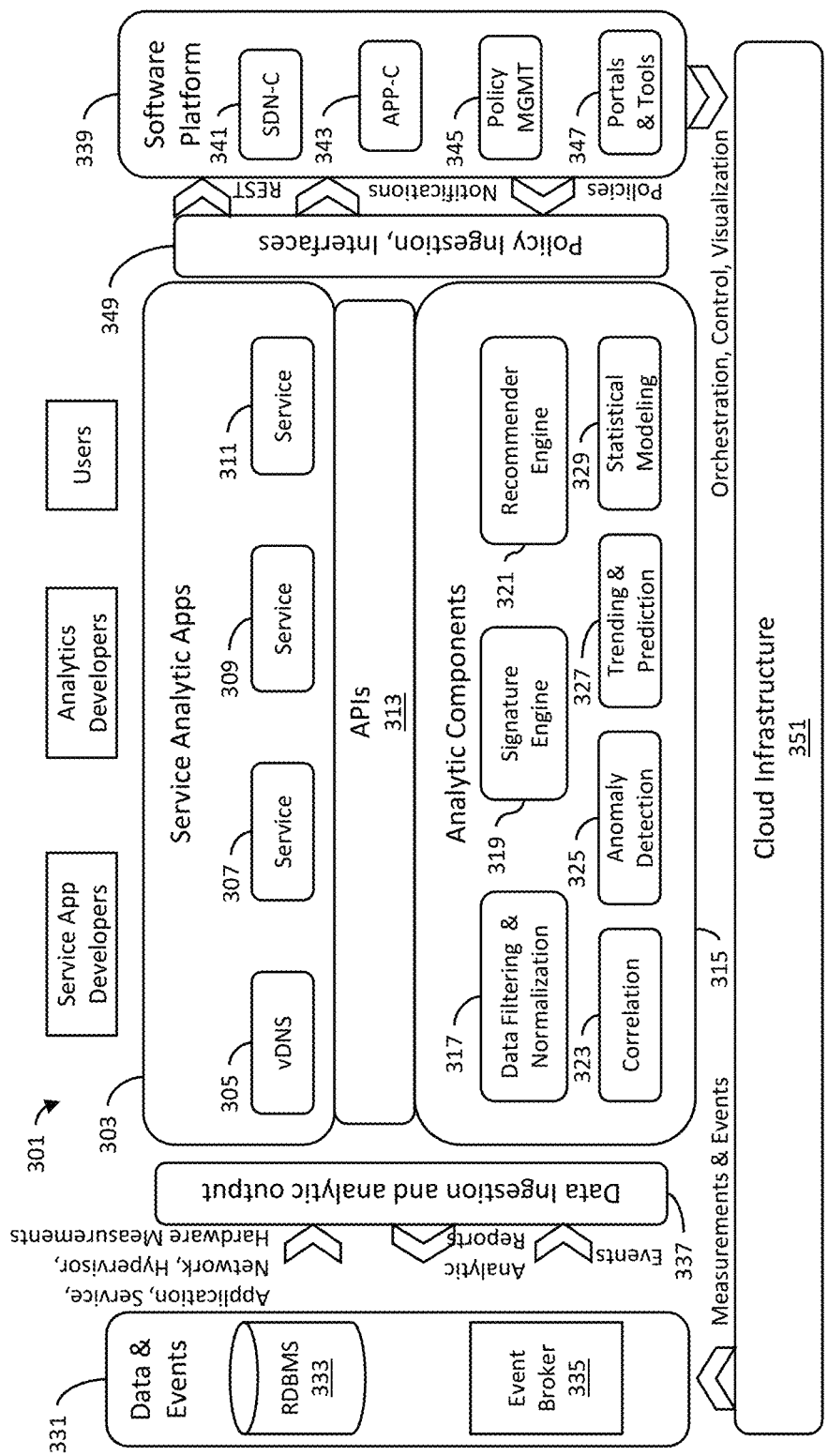
FIG. 2 is a schematic of an embodiment of the functional architecture for an embodiment of a system for controlling anycast traffic.
Figure 3:
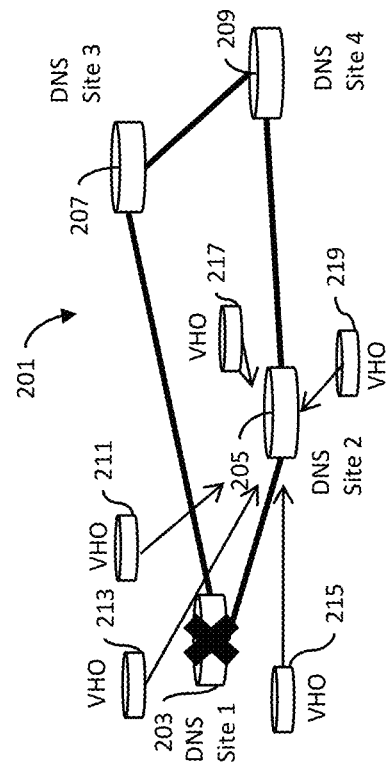
FIG. 3 is a schematic of a network having a plurality of DNS nodes.
Figure 4:
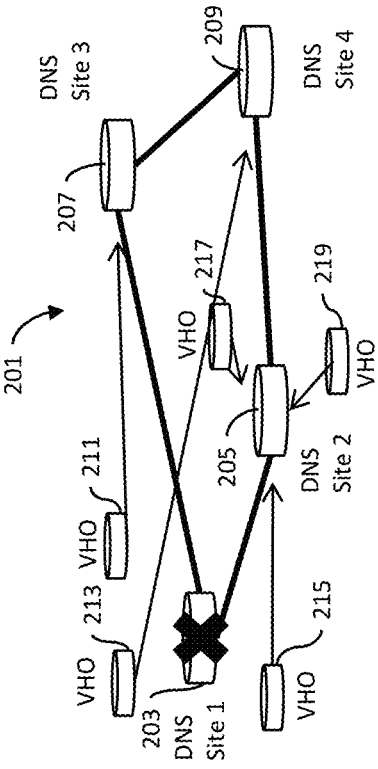
FIG. 4 is a schematic of the network where one of the DNS nodes has failed.
Figure 5:
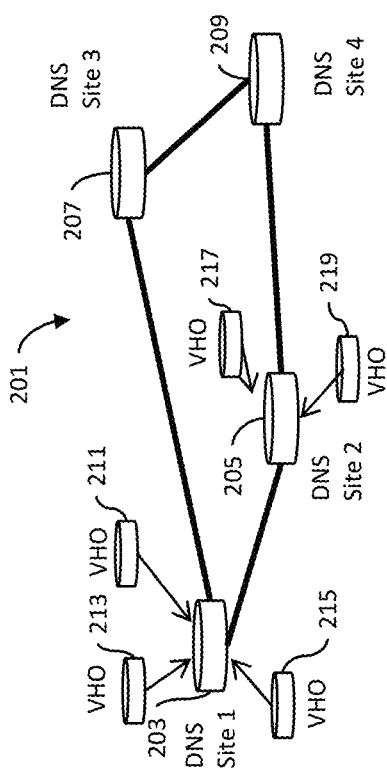
FIG. 5 is a schematic of the network were two of the DNS nodes have failed.

FIG. 2 is a schematic of an embodiment of the functional system architecture 301 for the system for controlling anycast traffic 101.

The functional system architecture 301 includes service analytics applications 303, such as for example, virtual DNS resolver 305 and various other services such as service 307, service 309, and service 311.

Service analytics applications 303 are coupled through APIs 313 to an analytics component module 315. Analytics component module 315 may include a data filtering and normalization module 317, a signature engine 319, a recommender engine 321, a correlation module 323, an anomaly detection module 325, a trending and prediction module 327 and a statistical modeling module 329.

The functional system architecture 301 also includes a data and events module 331 which may include a relational database management system 333 and an event broker 335. The data and events module 331 provides the service analytics applications 303 and the analytics component module 315 with event information, from the event broker 335 and application, service, network, hypervisor, and hardware measurement data that may be stored in the relational database management system 333. The data and events module 331 also receives analytic reports from the service analytics applications 303 and the analytics component module 315.

The functional system architecture 301 also includes a software platform 339 which may include a software defined network controller 341, an applications controller 343, a policy management module 345, and a portal and tools module 347. Software platform 339 may receive notifications and representational state transfer (REST) data from service analytics applications 303 and the analytics component module 315, and provide policies to the service analytics applications 303 and the analytics component module 315. The data to and from the software platform 339 is provided through an interface module 349. Software platform 339 communicates with the cloud infrastructure 351 to provide orchestration control and visualization and provides the data and events module 331 with measurement data and event data.

In an embodiment, the system for controlling anycast traffic 101 may be used to improve the operation of a large-scale deployment of virtual DNS (vDNS) under a variety of normal and aberrant network traffic conditions. Currently, most operational instances of DNS run at low average server utilization (~20-30%), as operators need ample spare capacity to absorb traffic surges due to flash-crowds, site or routing failures, and large-scale volumetric attacks. For example, the Root DNS servers are vastly over-provisioned with service available at more than five hundred sites in over one hundred countries and with capacity vastly higher than what is needed for normal traffic demand. However, the current static configuration presents two distinct disadvantages: 1) increased capital and operational costs due to idle hardware resources and wasted power, and 2) increased latencies due to higher recursion rate (caused by lower cache-hit ratio) as queries (and caches) are spread out to a very large number of DNS resolvers. Operating vDNS at higher utilization can lead to a reduction in operational and capital expenses, as well as an improvement in the performance experienced by end-users. However, operating at higher utilization can also increase the risk of overload due to flash crowds or routing failures that could potentially drive more traffic to a site. To maintain performance targets, this risk needs to be mitigated by active VM resource management.

Figure 6:
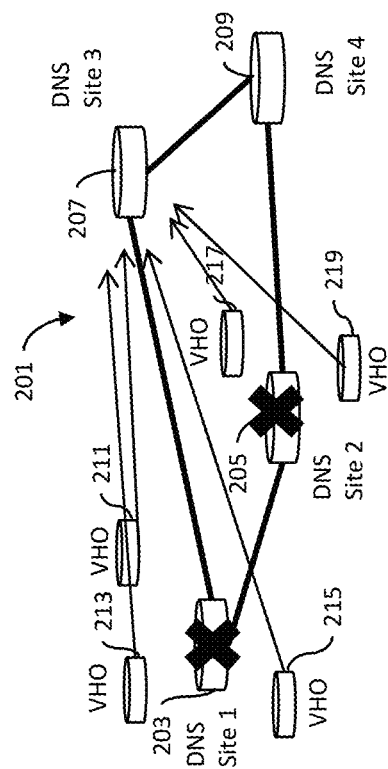
FIG. 6 is a schematic of the network traffic as controlled in accordance with an embodiment of the present disclosure.

Using a large deployment of virtualized DNS resolvers the volume of user traffic to certain VMs may be increased while observing a number of application and platform metrics. The system for controlling anycast traffic 101 would intelligently direct the traffic to other nodes as illustrated in FIG. 6. Thus, in the event of a DDoS attack, new resources can be deployed strategically in the DNS system 201 to diffuse the attack. Using SDN-based traffic steering, legitimate traffic can be re-routed to newly deployed resources. Through telemetry and automation, the attack reaction time can be reduced significantly. This approach is compatible with most existing solutions and can unlock the free capacity of the deployed infrastructure more effectively.

Figure 7:
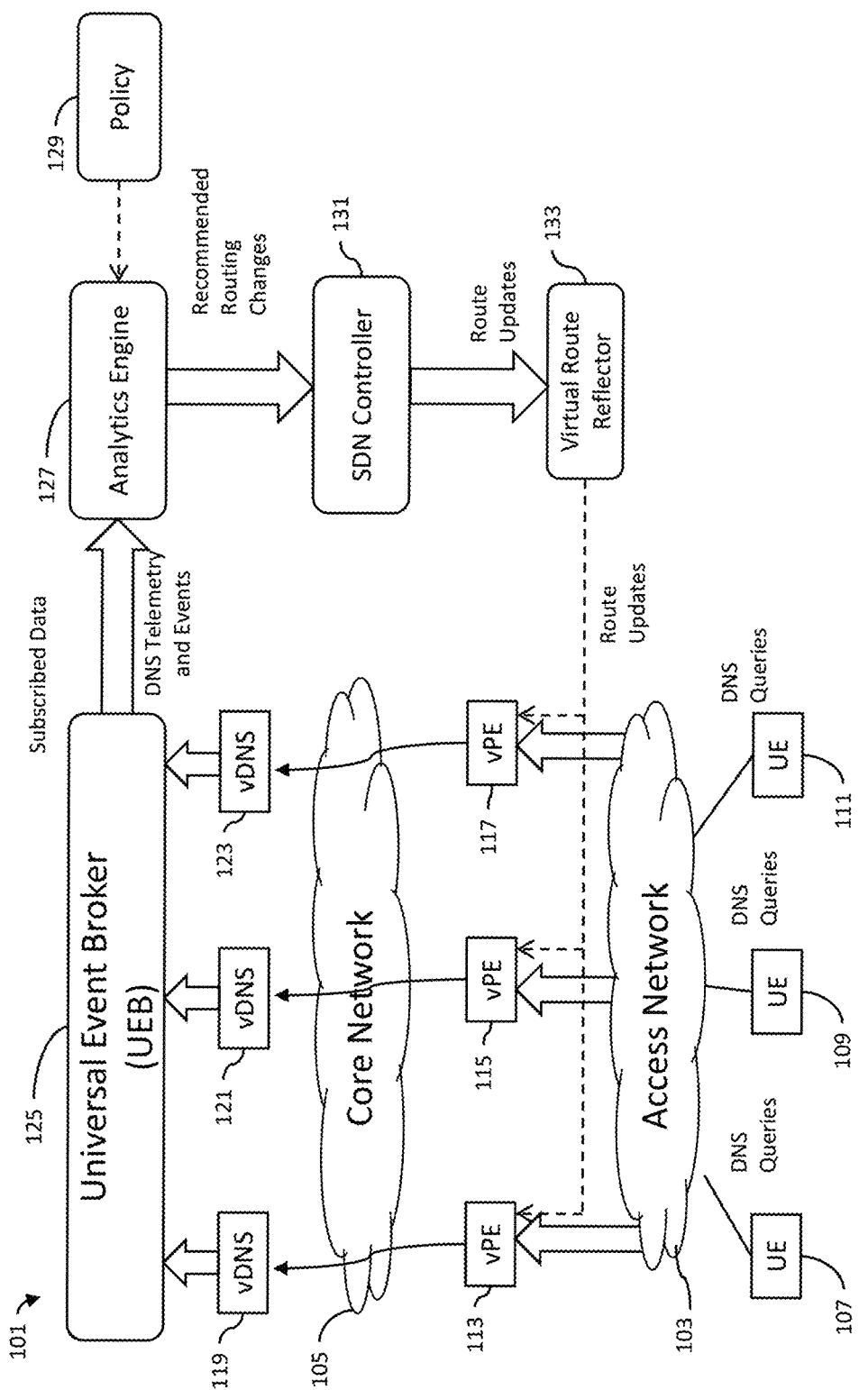
FIG. 7 is a schematic of an embodiment of the system for controlling anycast traffic illustrating the default traffic routing.
Figure 8:
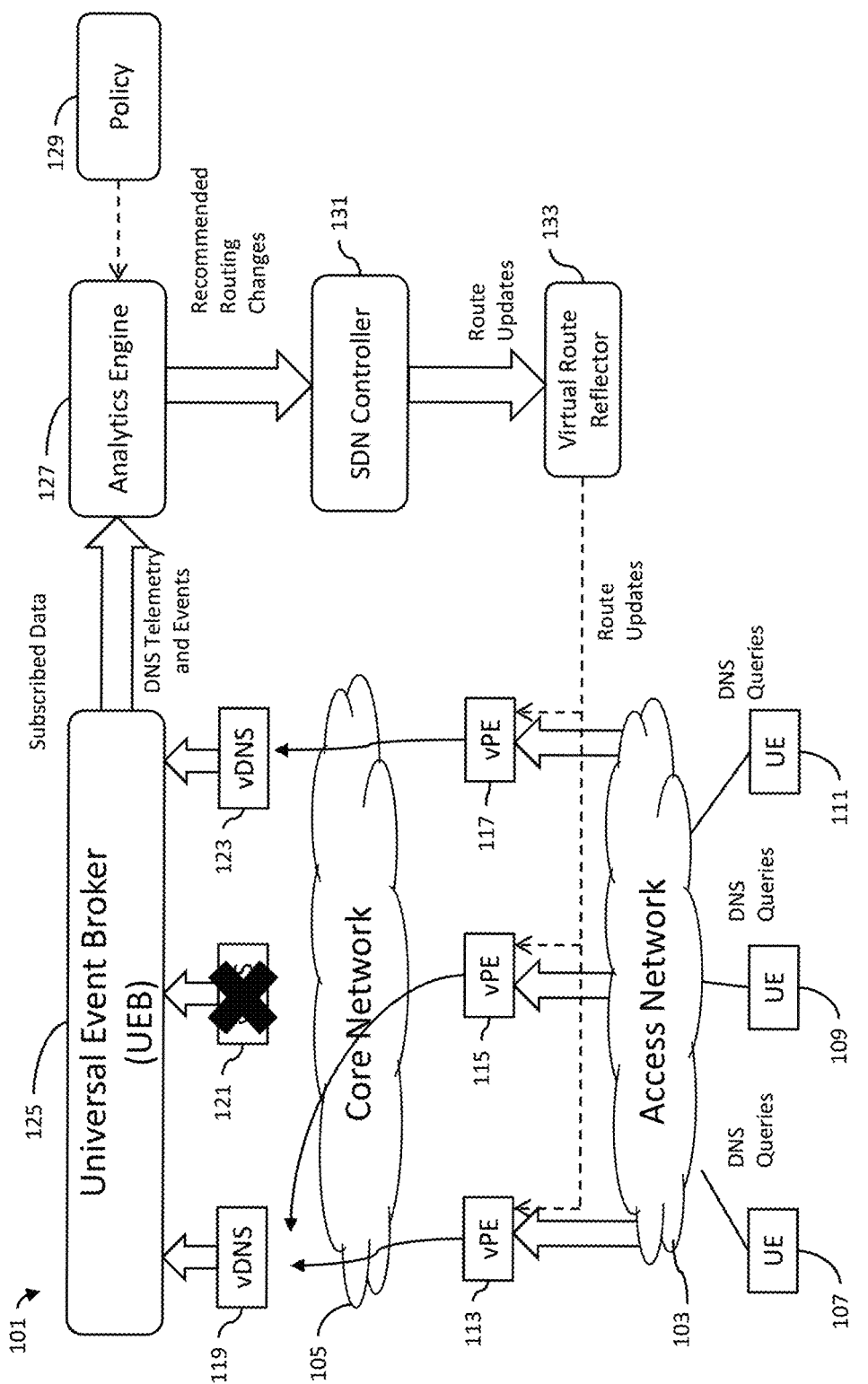
FIG. 8 is a schematic of an embodiment of the system for controlling anycast traffic illustrating the default traffic routing when a node fails.
Figure 9:
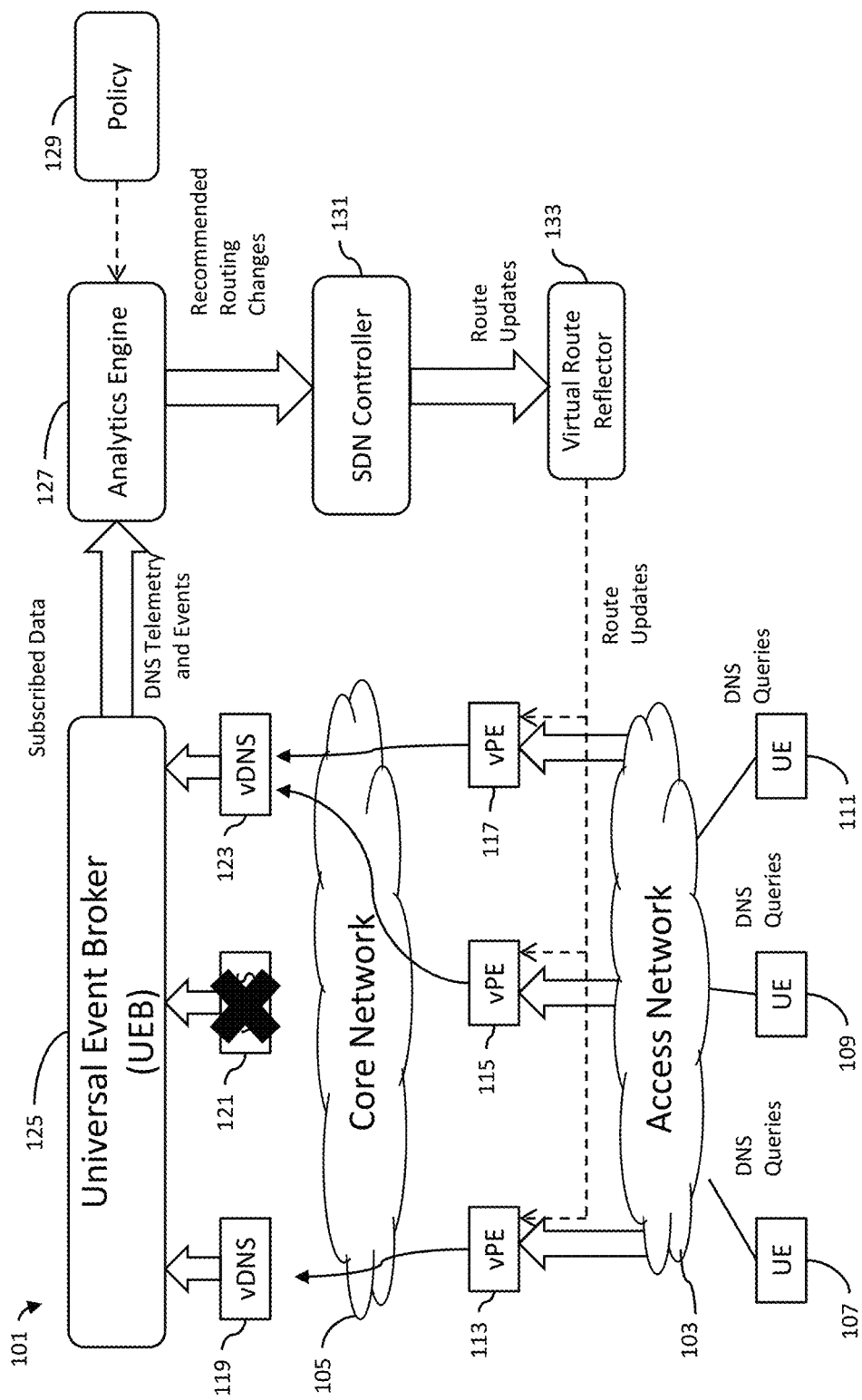
FIG. 9 is a schematic of an embodiment of the system for controlling anycast traffic illustrating the traffic routing in accordance with the methods of the present disclosure.

FIGS. 7, 8 and 9 are schematics that illustrate various scenarios. FIG. 7 illustrates a first scenario where system for controlling anycast traffic 101 is operating normally. In that scenario traffic from vPE 113 is routed to vDNS 119, traffic from vPE 115 is routed to vDNS 121 and traffic from vPE 117 is routed to vDNS 123. FIG. 8 illustrates the second scenario where vDNS 121 fails. In that scenario traffic from vPE 115 is diverted to vDNS 119. In this case, vDNS 119 is close in proximity to vPE 115. FIG. 9 illustrates the third scenario where traffic from vPE 115 is routed to vDNS 123 (by means of a policy driven optimal redirect) which has more available resources to handle the traffic.

Figure 10:
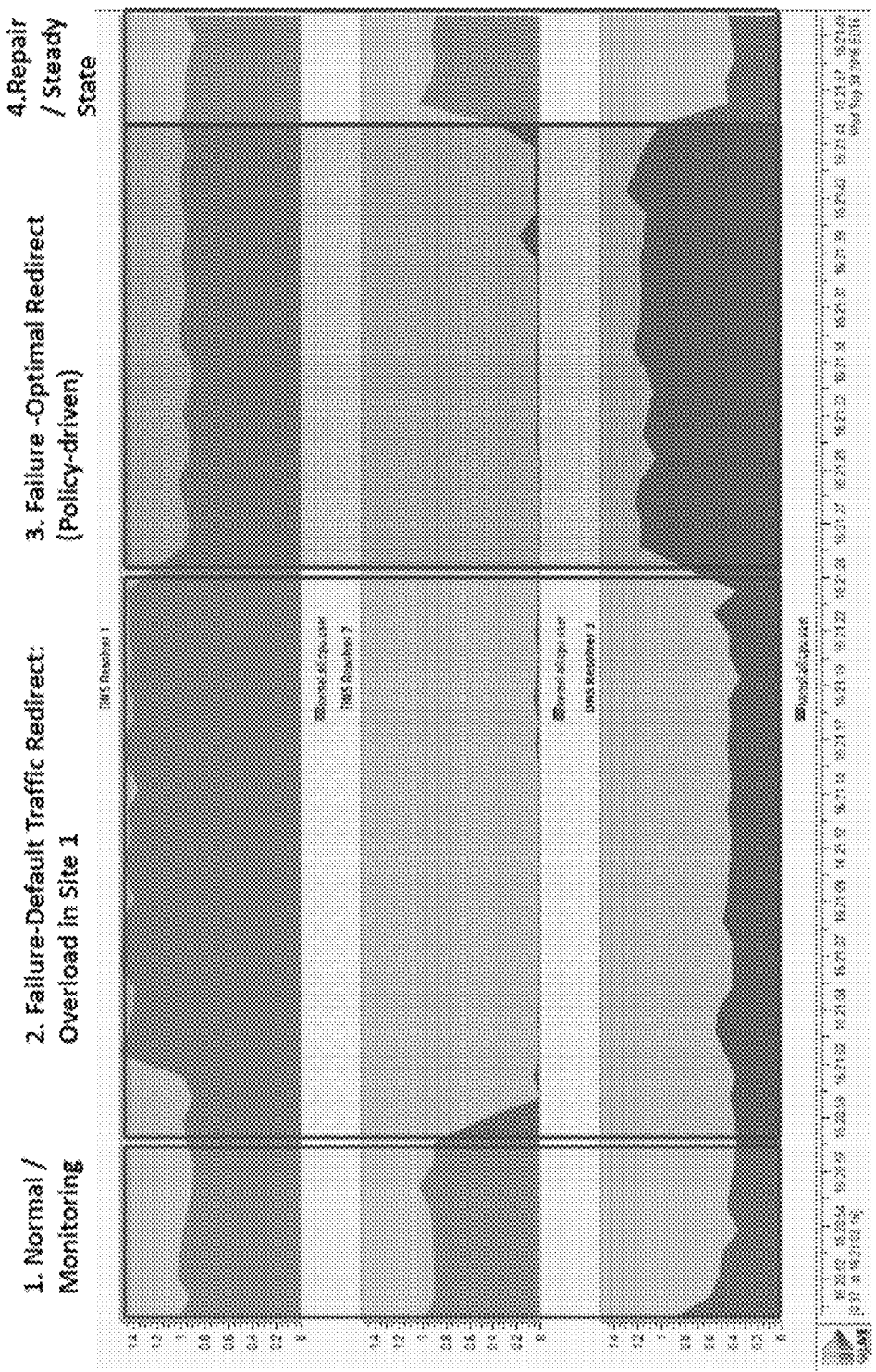
FIG. 10 is a chart illustrating CPU usage at the DNS nodes for various conditions.

FIG. 10 illustrates the CPU usage for the different scenarios presented above. As can be seen from FIG. 10 the failure default traffic redirect in scenario two would result in an overload in vDNS 119, whereas the policy driven failure optimal redirect of scenario number three would not result in an overload.

Core Network Services or CNS, such as DNS, Time (NTP), IP Address Management (IPAM), Addressing (DHCP), Configuration (TFTP/HTTP), Authentication (Radius), and authentication of client server applications (Kerberos) are services that may be deployed using the same methods described in this disclosure.

Figure 11:
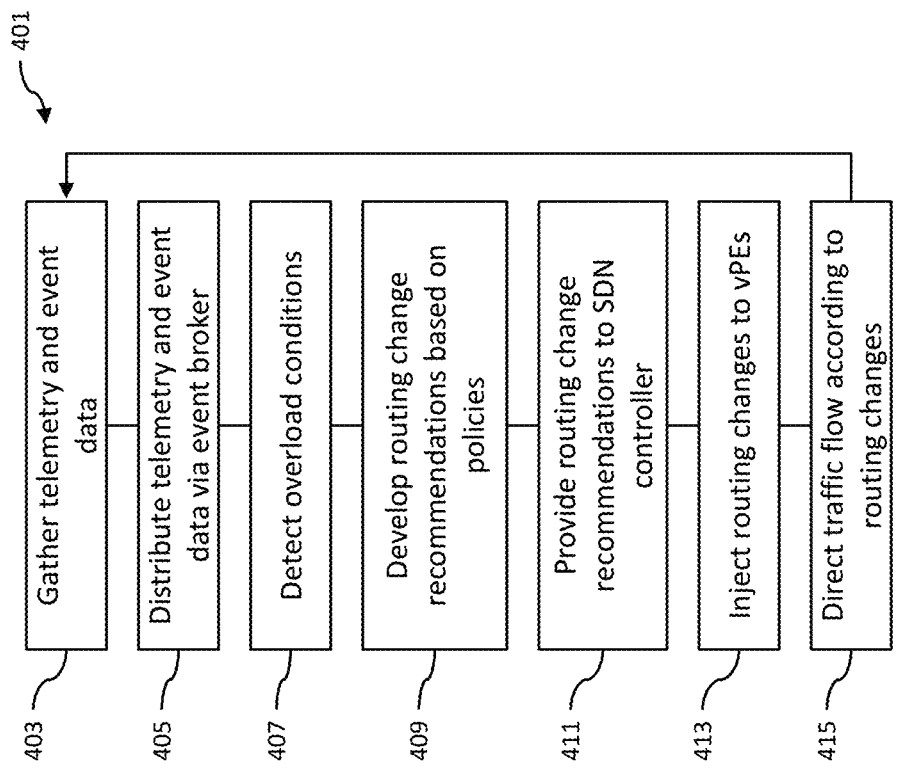
FIG. 11 is a flowchart of an embodiment of a method to controlling anycast traffic.

FIG. 11 is a flowchart describing an embodiment of a method to control anycast traffic using a software defined network controller 401.

In step 403 telemetry and event data is gathered by a universal event broker such as UEB 125 in FIG. 1.

In step 405 UEB 125 distributes telemetry and event data to an analytics engine such as analytics engine 127 in FIG. 1.

In step 407 the analytics engine 127 may detect overload conditions.

In step 409 the analytics engine 127 develops routing change recommendations based on policies derived from a policies module such as policy module 129 in FIG. 1. Policy-based routing provides a mechanism for expressing and implementing forwarding/routing of data packets based on the policies defined by the network administrators. Routers forward packets to the destination addresses based on information from static routes or dynamic routing protocols. Instead of routing by the destination address, policy-based routing allows network administrators to determine and implement routing policies to allow or deny paths based on a number of criteria such as the identity of a particular end system, the application, the protocol and the size of packets. Policies can be defined as simply as "the network will not carry traffic from a specific source" or as complex as "traffic originating within the network with the following characteristics will take path A, while traffic originating outside the network will take path B." Example of a policy may be to reroute traffic in the case of an overload condition to a node with the least amount of traffic.

In step 411 the analytics engine 127 provides routing change recommendations to an SDN controller such as SDN controller 131 in FIG. 1.

In step 413 flows implementing the routing changes are injected into vPEs (e.g. vPE 113, vPE 115 and vPE 117 of FIG. 1). The flows may be injected by a virtual route reflector such as vRR 133 in FIG. 1.

In step 415 the vPEs direct the traffic flow according to the routing changes.

Thereafter the method returns to gather telemetry and event data (step 403).

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method for controlling anycast traffic in a network comprising:
   receiving, at an event broker, telemetry and event data from a plurality of service nodes in a network using anycast traffic routing;
   sending the telemetry and event data from the plurality of service nodes via the event broker to an analytics engine;
   detecting, at the analytics engine, resource conditions at some of the plurality of service nodes based upon the telemetry and event data;
   accessing a plurality of policies defined by a network administrator, wherein the plurality of policies comprises the determination and implementation of routing policies to allow or deny paths based on criteria, wherein criteria comprises identity of the end system, identity of the application, identity of the protocol inside packets, dynamic routes, or static routes;
   developing anycast traffic routing change recommendations at the analytics engine based on the plurality of policies;
   providing, through the analytics engine, the anycast traffic routing change recommendations to a software defined network controller based on the resource conditions and the plurality of policies, whereby routing is implemented based on the plurality of policies and not by a destination address;
   selecting a selected service node based on the anycast routing change recommendations;
   implementing the traffic routing change recommendations through the software defined network controller; and
   redirecting the anycast traffic to the selected service node.

2. The method of claim 1 wherein the telemetry and event data further comprises at least queries per second.

3. The method of claim 1 wherein the redirecting of the anycast traffic is by a virtual private edge router, wherein the virtual private edge router is a second virtual machine.

4. The method of claim 1 further comprising gathering new telemetry and event data from the plurality of service nodes after implementation of the traffic routing change recommendations.

5. A system comprising:
   memory for storing computer instructions;
   one or more processors coupled with the memory, wherein the one or more processors, responsive to executing the computer instructions, performs operations comprising:
   receiving at the event broker telemetry and event data from a plurality of service nodes in a network;
   sending the telemetry and event data via the event broker to an analytics engine;
   detecting at the analytics engine resource conditions at each of the plurality of service nodes based upon the telemetry and event data;
   accessing a plurality of policies defined by a network administrator, wherein the plurality of policies comprises the determination and implementation of routing policies to allow or deny paths based on criteria, wherein criteria comprises identity of the end system, identity of the application, identity of the protocol inside packets, dynamic routes, or static routes;
   developing anycast traffic routing change recommendations at the analytics engine based on the plurality of policies;
   providing through the analytics engine the anycast traffic routing change recommendations to the software defined network controller based on resource conditions at each of the plurality of service nodes and the plurality of policies whereby routing is implemented based on the plurality of policies and not by a destination address;
   selecting a selected service node based on the anycast routing change recommendations;
   implementing the traffic routing change recommendations through the software defined network controller; and
   redirecting the anycast traffic to the selected service node.

6. The system of claim 5 wherein the telemetry and event data further comprises at least outages.

7. The system of claim 5 wherein the redirecting of the anycast traffic is by a virtual private edge router, wherein the virtual private edge router is a second virtual machine.

8. The system of claim 5 wherein implementing the traffic routing change recommendations comprises directing a route change into virtual processing elements.

9. The system of claim 5 wherein the processor, responsive to executing the computer instructions, performs operations comprising gathering new telemetry and event data from the plurality of service nodes after implementation of the traffic routing change recommendations.

10. A non-transitory, tangible computer-readable medium having computer-executable instructions stored thereon which, when executed by a computer, cause the computer to perform a method comprising:
    receiving at an event broker telemetry and event data from a plurality of service nodes in a network configured to provide anycast traffic;
    sending the telemetry and event data via the event broker to an analytics engine, wherein the telemetry and event data comprises a protocol and size of packets;
    detecting at the analytics engine overload conditions at some of the plurality of service nodes based upon the telemetry and event data;
    accessing a plurality of policies defined by a network administrator, wherein the plurality of policies comprises the determination and implementation of routing policies to allow or deny paths based on criteria, wherein criteria comprises identity of the end system, identity of the application, identity of the protocol inside packets, dynamic routes, or static routes;
    developing anycast traffic routing change recommendations at the analytics engine based on the plurality of policies;
    providing through the analytics engine the anycast traffic routing change recommendations to a software defined network controller based on the resource conditions at each of the plurality of service nodes and the plurality of policies;
    implementing the traffic routing change recommendations through the software defined network controller; and
    redirecting the anycast traffic to the selected service node.

11. The non-transitory, tangible computer-readable medium of claim 10 wherein the telemetry and event data further comprises at least CPU utilization.

12. The non-transitory, tangible computer-readable medium of claim 10 wherein the redirecting of the anycast traffic is by a virtual private edge router, wherein the virtual private edge router is a second virtual machine.

13. The non-transitory, tangible computer-readable medium of claim 10 wherein implementing the traffic routing change recommendations comprises directing a route change to virtual processing elements.

14. The non-transitory, tangible computer-readable medium of claim 10 further comprising computer-executable instructions stored thereon which, when executed by a computer, cause the computer to perform the method further comprising gathering new telemetry and event data from the plurality of service nodes in the network after implementation of the traffic routing change recommendations.

15. The method of claim 1 wherein the software defined network controller provides a route update to a virtual route reflector, wherein the virtual route reflector is a first virtual machine.

16. The system of claim 5 wherein the software defined network controller provides a route update to a virtual route reflector, wherein the virtual route reflector is a first virtual machine.

17. The non-transitory, tangible computer-readable medium of claim 10 wherein the software defined network controller provides a route update to a virtual route reflector, wherein the virtual route reflector is a first virtual machine.

\* \* \* \* \*